United States Patent Office.

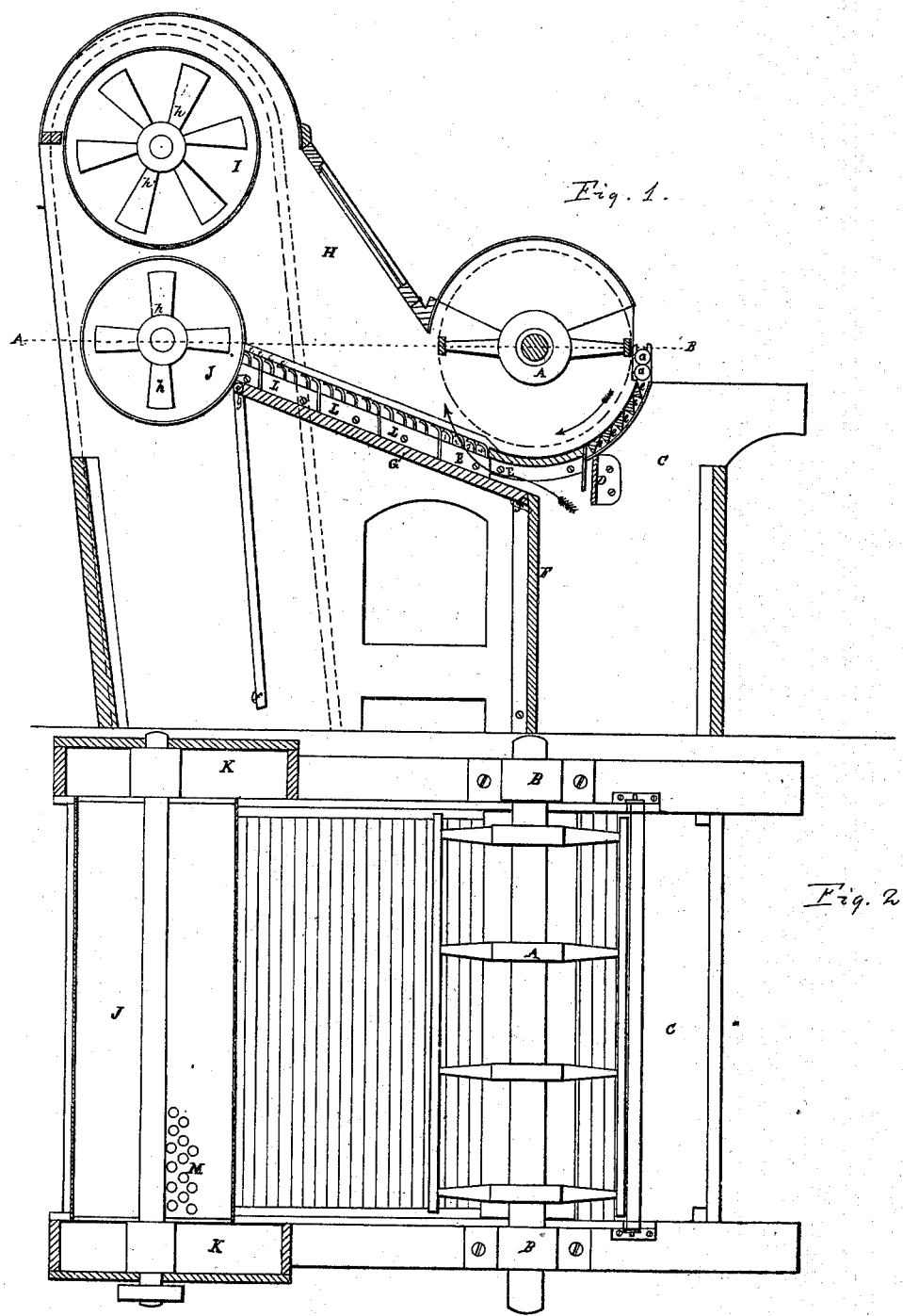

IMPROVEMENT IN MACHINE FOR OPENING AND CLEANING COTTON.

RICHARD KITSON, OF LOWELL, MASSACHUSETTS.

Letters Patent No. 60,387, dated December 11, 1866.

---

The Schedule referred to in these Letters Patent and making part of the same.

---

TO ALL WHOM IT MAY CONCERN:

Be it known that I, RICHARD KITSON, of Lowell, in the county of Middlesex, and State of Massachusetts, have invented a new and useful improvement in the machines which are used for Opening and Cleaning Cotton and other fibrous substance, of which the following is a full, clear, and exact description, reference being had to the accompanying drawings, making part of this specification, in which—

Figure 1 is a longitudinal vertical section.

Figure 2, a plan on the line A B of fig. 1.

This invention consists of a seed-chamber combined with a leaf-chamber, under the slatted rack or other similar device arranged beneath and forward of the beater or other working cylinder, which acts upon the cotton or other fibrous substance as it passes between suitable feed-rolls, to open said cotton and liberate the seed, leaf, and other refuse matter from the perfect fibre, and force the former through the rack or racks into the seed and leaf-chambers below.

My invention also consists in a suitable fender, arranged beneath the seed-rack, and in contact with the lower slat thereof, to prevent the seed which have been forced through the seed-rack, or between the slats, being drawn back again by the strong current of air generated by the draught fan, which draws the dust out of the machine.

The beater A, or other working cylinder, is constructed and arranged in the usual manner; it rotates in bearings, B, at each end, and may be driven by a belt, as usual; feed-rolls, a, are also employed, between which and the beater or other working cylinder the cotton is opened. A rack composed of triangular slats extends from the bottom feed-roll a, downward in a circular groove to nearly under the centre of the beater A. Nearly all the seed and coarse heavy matter separated from the perfect fibre of the cotton, pass between the triangular slats e e, into the seed-chamber C, beneath said rack, with considerable force, striking the fender D, and falling into the space below; whereas if the fender were not used, a large portion of the seed passing through the rack would be thrown forward into the throat E, and by the strong draught of air generated by the draught-fan, would be drawn upward through the spaces 1, 2, 3, 4, between the curve-topped slats, through the space or throat E, or directly back between the slats e, and be carried out with the cotton. All the air forced into the seed-chamber C, may pass readily upward between the fender D and the vertical partition F, over the edge of the inclined hinged bottom, G, through the spaces 1, 2, 3, 4, into the chamber H, to be drawn off with the dust, dirt, and refuse matter through the perforated or wire-clad cylinders, I and J, and dust-trunks K, to any place of deposit. Certain of the curve-topped slats, e, are deeper than the others, extending downward to the hinged or pivoted bottom, G, and forming compartments or leaf-chambers, L, into which a large portion of the leaf and trashy matter falls; this refuse matter may be removed by liberating the bottom G at f, and allowing it to swing on the hinge or pivot g, when the refuse matter falls into the compartment below. The cylinders I and J may be made of thin metal like sheet zinc, and perforated as at M, or they may be covered with woven wire, with meshes fine enough to allow the dust and fine dirt to pass through, but keep the cotton on the outside openings, h, through the ends of the cylinders I and J, provide for the easy passage of the air, dust, and fine dirt, into the dust-trunks K, from which it is removed by a proper draught-fan, or other suitable device connected with said dust-trunks at any point thereof. The cotton passes between the cylinders I and J, and may fall on the floor or be delivered to some other machine, there to be formed into a lap or otherwise.

1. I claim the fender D, arranged beneath the seed-rack, substantially in the manner and for the purpose set forth.

2. Forming the communication between the seed-chamber C and throat E, so as to allow the air to pass from the seed-chamber to the dust-trunks K, giving vent to the seed-chamber C, and preventing the seed being sucked back again with the cotton, substantially as set forth.

RICHARD KITSON.

Witnesses:
JOHN E. CRANE,
C. A. KENDALL.